US008260042B2

(12) United States Patent
Peng et al.

(10) Patent No.: US 8,260,042 B2

(45) Date of Patent: Sep. 4, 2012

(54) ANONYMOUS PASSENGER INDEXING SYSTEM FOR SECURITY TRACKING IN DESTINATION ENTRY DISPATCHING OPERATIONS

(75) Inventors: Pei-Yuan Peng, Ellington, CT (US); Norbert A. M. Hootsmans, South Glastonbury, CT (US)

(73) Assignee: Otis Elevator Company, Farmington, CT (US)

( * ) Notice: Subject to any disclaimer, the term of this patent is extended or adjusted under 35 U.S.C. 154(b) by 739 days.

(21) Appl. No.: 12/438,920

(22) PCT Filed: Aug. 25, 2006

(86) PCT No.: PCT/US2006/033229

§ 371 (c)(1), (2), (4) Date: Feb. 25, 2009

(87) PCT Pub. No.: WO2008/024115

PCT Pub. Date: Feb. 28, 2008

(65) Prior Publication Data

US 2009/0208067 A1 Aug. 20, 2009

(51) Int. Cl.
*G06K 9/00* (2006.01)

(52) U.S. Cl. ........................................ 382/162; 382/115

(58) Field of Classification Search .................. 382/115, 382/162, 165; 701/45; 704/275
See application file for complete search history.

(56) References Cited

U.S. PATENT DOCUMENTS

| | | | |
|---|---|---|---|
| 5,182,776 | A | 1/1993 | Suzuki et al. |
| 5,432,545 | A | 7/1995 | Connolly |
| 6,339,375 | B1 | 1/2002 | Hirata et al. |
| 2001/0035314 | A1 | 11/2001 | Yoshida et al. |
| 2002/0112922 | A1 | 8/2002 | Smith |
| 2005/0006183 | A1 | 1/2005 | Smith et al. |
| 2006/0065490 | A1 | 3/2006 | Zaharia et al. |

FOREIGN PATENT DOCUMENTS

| | | | |
|---|---|---|---|
| JP | 2004362210 | A | 12/2004 |
| WO | WO 2005/118452 | A1 | 12/2005 |

OTHER PUBLICATIONS

Intellectual Property Office Search Report dated Apr. 15, 2010 from the International Search Authority for corresponding foreign application GB0903214.5 filed Aug. 25, 2006 (2 pages).
International Search Report dated Apr. 5, 2007 from the International Searching Authority for corresponding foreign application PCT/US06/033229 filed Aug. 25, 2006 (2 pages).
Written Opinion of the International Searching Authority dated Apr. 5, 2007 for corresponding foreign application PCT/US06/033229 filed Aug. 25, 2006 (3 pages).
Funt et al. Color Constant Color Indexing, IEEE Transactions on Pattern Analysis and Machine Intelligence, vol. 17, No. 5, May 1995, 552-529.
Office Action from Japanese Application Serial No. 2009-525532.

*Primary Examiner* — Duy M Dang
(74) *Attorney, Agent, or Firm* — Kinney & Lange, P.A.

(57) ABSTRACT

An elevator control system (18) provides elevator dispatch and door control based on passenger data received from a video processing device (12). The video processing device (12) includes a video processor (14) connected to receive video input from at least one video camera (10) and memory (16). The video processor (14) anonymously monitors passengers using color index analysis of each passenger. Based on the monitored position of each passenger, video process (14) calculates passenger data parameters such as location, direction, speed and estimated time of arrival at an elevator door, and provides one or more of the passenger data parameters to elevator control system (18). Based in part on the passenger data received, elevator controller (18) provides elevator dispatch, elevator door control, and security functions.

20 Claims, 4 Drawing Sheets

ANONYMOUS PASSENGER INDEXING SYSTEM FOR SECURITY TRACKING IN DESTINATION ENTRY DISPATCHING OPERATIONS

BACKGROUND OF THE INVENTION

The present invention relates generally to the field of elevator control and security, and more particularly to providing a video aided elevator system capable of anonymously tracking elevator passengers to improve elevator dispatch and door control.

Elevator performance, as perceived by elevator passengers, is derived from a number of factors. To a typical elevator passenger, the most important factor is time. As time-based parameters are minimized, passenger satisfaction with the service of the elevator improves. The overall amount of time a passenger associates with elevator performance can be broken down into three time intervals.

The first time interval is the amount of time a passenger waits in an elevator hall for an elevator to arrive, hereafter the "wait time". Typically, the wait time consists of the time beginning when a passenger pushes an elevator call button, and ending when an elevator arrives at the passenger's floor. The second time interval is the "door dwell time" or the amount of time the elevator doors are open, allowing passengers to enter or leave the elevator. It would be beneficial to minimize the amount of time the elevator doors remain open, after all waiting passengers have entered or exited an elevator cab. The third time interval is the "ride time" or amount of time a passenger spends in the elevator. If a number of passengers are riding on the elevator, then the ride time may also include stops on a number of intermediate floors.

A number of systems and algorithms have been developed to minimize the total time associated with using an elevator. For example, destination entry systems have begun to replace typical call button elevator systems. Destination entry systems require a user to indicate the desired destination floor, typically at a kiosk or workstation adjacent to an elevator hall. Based on the current status of elevator cabs (including location and assigned destinations), an elevator control system assigns the user to a specific elevator cab. The algorithms employed by destination entry systems in assigning elevator cabs to individual passengers are aimed at improving elevator performance, including minimizing the wait time and ride time of elevator passengers. The efficient assignment of elevator cabs to specific users improves elevator performance, although the use of destination entry systems creates new obstacles to efficiency, such as the situation in which an elevator cab is assigned to a user that subsequently decides not to take the elevator, or stops to chat in an elevator hall for an extended period of time. Despite the lack of a passenger, the assigned elevator cab will still travel to the destination floor entered by the passenger, increasing inefficiency of the system. Similarly, a passenger that enters an unassigned elevator cab may be taken to the wrong floor, which requires subsequent elevator service to transport the passenger to the correct floor. Therefore, it would be beneficial to develop a system, and in particular a system suited to solve some of the problems associated with destination entry systems, that will increase the efficiency of elevator operations.

Many elevator systems are also integrated with access control and security systems. The goal of these systems is to detect, and if possible, prevent unauthorized users from gaining access to secure areas. Because elevators act as access points to many locations within a building, elevator doors and cabs are well suited to perform access control. In the case of destination entry systems, it is also important to ensure passengers enter the assigned elevator cab (i.e., the elevator cab assigned to take them to the desired destination floor). Therefore, it would be desirable for an elevator system to provide access control as well as ensuring that passengers enter the correct elevator cab.

BRIEF SUMMARY OF THE INVENTION

In the present invention, a video-aided elevator dispatch and control system provides anonymous tracking of passengers to improve elevator performance. The video monitoring system includes a video processor connected to receive video input from at least one video camera mounted to monitor the area outside of elevator doors. The video processor employs a color-indexing algorithm to anonymously identify and track elevator passengers as they move about the elevator hall. Based on the anonymous identification, the video processing system calculates a number of parameters and provides them to the elevator control system. The parameters are used by the elevator control system to efficiently operate the dispatch of elevator cabs, to control elevator door opening and closing, and to provide security measures to prevent unauthorized users from entering restricted floors.

DETAILED DESCRIPTION

The present invention provides anonymous indexing and tracking of elevator passengers using video analysis. Anonymous indexing allows the movements of elevator passengers to be tracked and followed, without requiring actual identification of each passenger (i.e., by means of identification cards such as RFID enabled cards). In the present invention, elevator passengers are identified using color indexing algorithms that identify passengers based on the color of the passengers' clothing. Based on an initial color index or color signature associated with a particular passenger, that passenger may be located and tracked as the passenger moves through an elevator hall and into a particular elevator. Based on tracking information provided by the anonymous indexing and tracking system of the present invention, elevator performance and security are improved.

Figure 1:
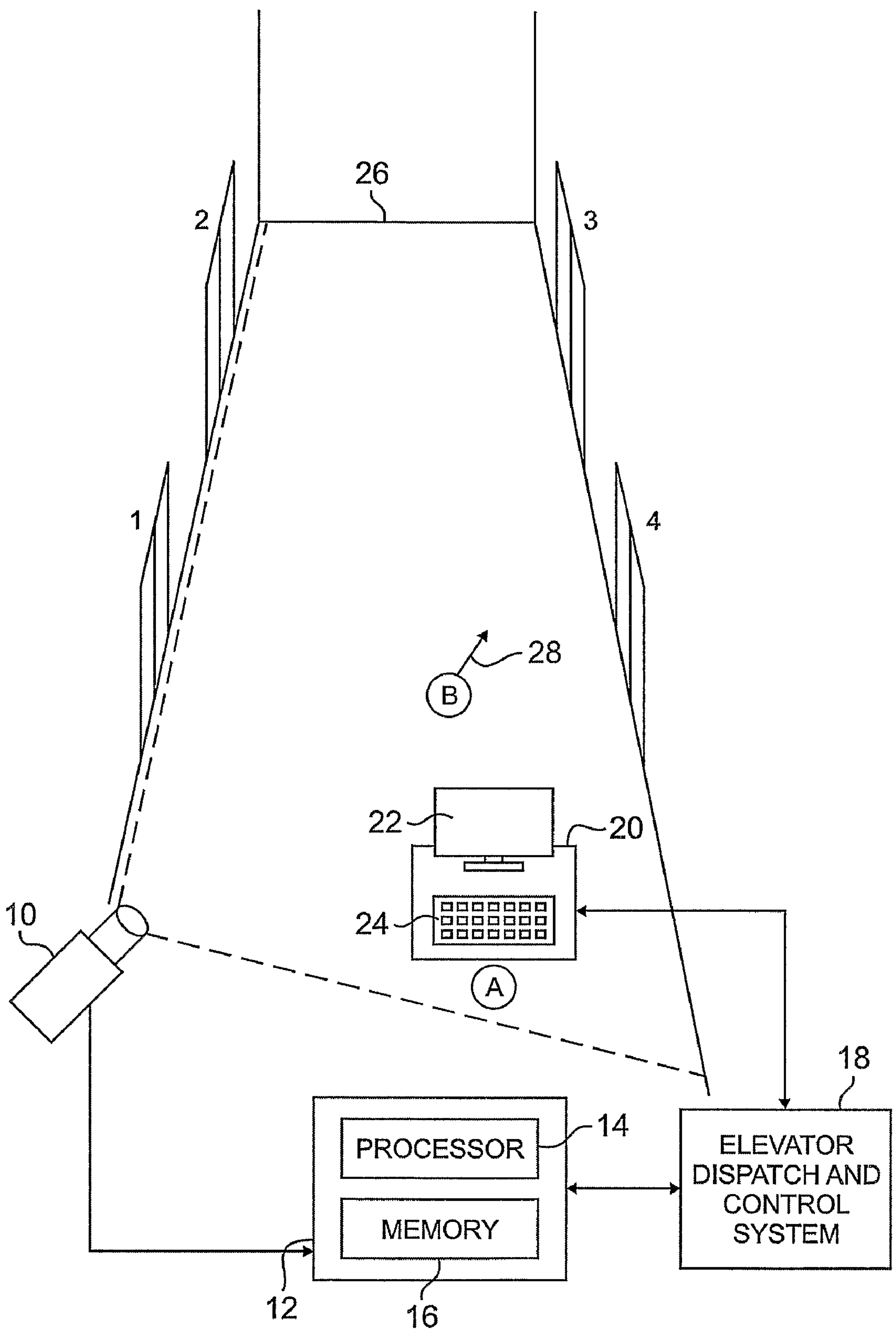
FIG. 1 shows functional block diagram representations of the anonymous passenger tracking system as deployed in an elevator hall.

FIG. 1 shows an embodiment of a video-aided elevator control system used in conjunction with a destination entry system. The system includes video camera 10, video server 12 including video processor 14 and memory 16, elevator dispatch and control system ("elevator control") 18, destination entry kiosk ("kiosk") 20 having display 22 and keypad 24, as well as four elevator doors (each associated with a particular elevator cab) labeled 1, 2, 3 and 4 (collectively, "the elevators") located in elevator hall 26. Two passengers, labeled 'A' and 'B' are also shown in FIG. 1. Passenger A is located at kiosk 20, and passenger B is moving through elevator hall 26.

Unlike call button elevators, in which a user must push a button located near the elevator doors to request elevator service, destination entry systems improve performance by requiring users to enter their destination floor at kiosk 20. A passenger's desired destination floor is communicated from kiosk 20 to elevator control 18. Based on a number of factors, elevator control 18 assigns the user to a particular elevator cab and communicates the assigned elevator cab to the user at kiosk 20.

In addition to the algorithms employed by elevator control 18 to improve performance by properly assigning passengers to elevator cabs, elevator control 18 also receives passenger data regarding passenger location and movement (including estimated time or arrival at an assigned elevator cab) from video server 12 to further improve elevator performance and security. Video camera 10 captures video data with respect to elevator hall 26, and provides the video data to video server 12 for processing, the details of which are described below. In short, video processor 14 employs a color indexing algorithm to anonymously identify passengers in elevator hall 26. By uniquely identifying each passenger, video server 12 is able to calculate a number of parameters associated with each passenger. For instance, the location, direction, speed and estimated time of arrival at an assigned elevator can be determined. Furthermore, by monitoring each passenger, elevator control 18 can determine whether a particular passenger enters the assigned elevator cab. These parameters are provided to elevator control 18, which uses the passenger data to make decisions regarding the efficient use of elevator resources.

Figure 2:
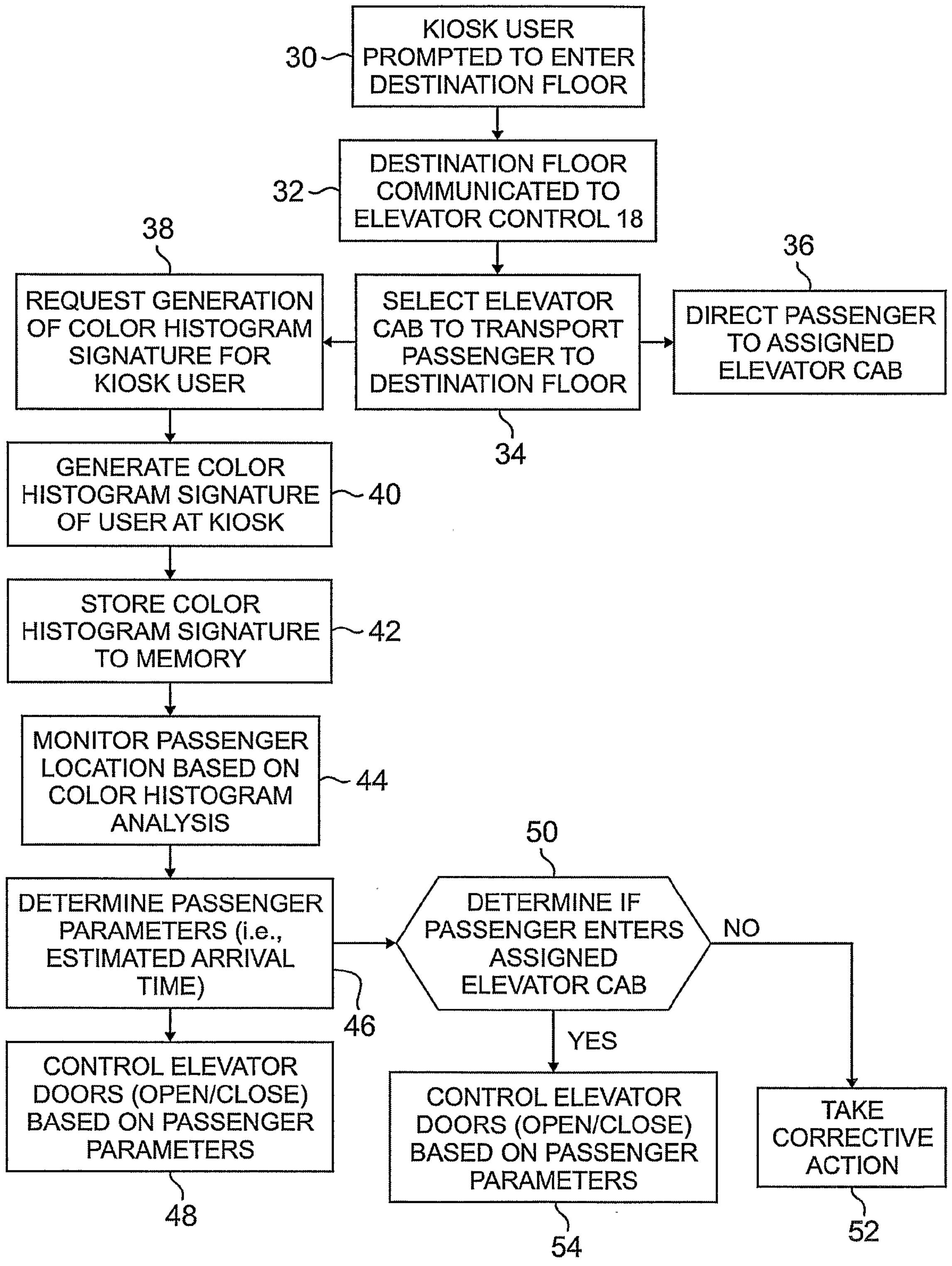
FIG. 2 is a flow chart that illustrates elevator control operations based on anonymous passenger tracking and indexing system.

FIG. 2 is a flow-chart illustrating a transaction between a passenger and the video aided elevator control system shown in FIG. 1. At step 30 a person desiring to use the elevators (for example, passenger A) approaches kiosk 20 and is prompted to enter a destination floor. At step 32, the destination floor entered by the passenger is communicated to elevator control 18. At step 34, elevator control 18 determines, based on a number of efficiency factors, which elevator cab should be assigned to transport the passenger at kiosk 20 to the desired floor. At step 36, the assigned elevator information is displayed to the user at kiosk 20, which instructs the passenger to proceed to the elevator doors (either 1, 2, 3 or 4) to wait for the assigned elevator cab.

At step 38 (and not necessarily after the assigned elevator cab has been provided to the kiosk user), video server 12 is notified of the presence of a passenger at kiosk 20, and is instructed to generate a color histogram signature for the kiosk user. In the embodiment shown in FIG. 1, elevator control 18 communicates a request to video server 12, notifying video server 12 of the presence of a user at kiosk 20 and requesting that video server 12 generate a color histogram signature for the kiosk user. When making a request to video server 12 to generate a color histogram signature, elevator control 18 may also provide video server 12 with the elevator cab (and associated elevator doors) assigned to the kiosk user. As described below, this allows video server to calculate passenger parameters related to estimated arrival time at the assigned elevator cab. Elevator control 18 may also provide a label (such as "passenger A") that uniquely identifies the kiosk user. This label allows video server 12 to communicate passenger information (such as location, speed, direction, and time of arrival at assigned elevator cab) to elevator control 18. For instance, video server 12 can communicate to elevator control 18 passenger parameters associated with both passengers A and B.

In other embodiments, kiosk 20 may communicate the request for generation of a color histogram signature directly to video server 12, or video server 12 may automatically identify when a user approaches kiosk 20, and will generate a color histogram signature without being prompted by either elevator control 18 or kiosk 20.

At step 40, video server 12 uses video input provided by video camera 10 to generate a color histogram signature for the passenger located at the kiosk. The algorithm employed to generate a color histogram signature is described in more detail with respect to FIG. 3, described below. In short, the color histogram signature allows video server 12 to uniquely identify the passenger as he or she moves about elevator hall 26. For instance, in FIG. 1 video server 12 would receive a request from elevator control 18 to generate a color histogram signature for passenger A. An example of the color histogram signature generated for passenger A is shown in FIG. 4A. A color histogram signature would also be generated for passenger B (for instance, when passenger B was entering a floor destination at kiosk 20), an example of which is shown in FIG. 4B. Because of differences in clothing, the color histogram signature generate with respect to passenger A is uniquely different than the color histogram signature generated for passenger B, allowing video server 12 to uniquely identify both passengers in elevator hall 26. At step 42, video server 12 stores the color histogram signature generated for the kiosk user (passenger A) to memory 16.

At step 44, video server 12 uses the stored color histogram signature generated at step 40 to uniquely identify and monitor passengers within elevator hall 26. Video server 12 identifies passenger (as described in more detail with respect to FIG. 3) by comparing the stored color histogram signatures with color histogram data calculated with respect to current video data (i.e., most recently captured video frame). By matching the stored color histogram signature with current color histogram data, video server 12 is able to uniquely identify passengers. For instance, a comparison of the current color histogram generated with respect to passenger B and a stored color histogram signature initially generated with respect to passenger B indicates a match that allows video server 12 to anonymously monitor or track passenger B throughout elevator hall 26.

At step 46, based on the monitored location of the passenger (as well as previously monitored locations of the passenger), a number of parameters can be calculated with respect to the passenger, such as location, speed, and direction of the passenger. For example, by identifying and monitoring passenger B in successive frames, the speed and direction of passenger B can be determined. In this case, video server 12 determines that passenger B is moving in a direction indicated by arrow 28 (as shown in FIG. 1). Based on this information, further parameters or metrics may be calculated, such as estimated arrival time of the passenger at the assigned elevator cab. In one embodiment, these calculations are performed by video server 12, and then communicated to elevator control 18. In other embodiments, video server 12 may be responsible for identifying passengers and determining their respective locations, leaving calculations regarding direction of travel and estimated time of arrival to elevator control 18.

At step 48, elevator control 18 uses the parameters provided by video server 12 (such as estimated time of arrival) to make decisions regarding the dispatch of the dispatch and control of elevator cabs. For instance, in the situation in which the elevator cab has reached the passenger's current floor and the passenger is moving towards the assigned elevator doors, then elevator control 18 controls the elevator doors to remain open until the passenger reaches and enters the assigned elevator cab. This feature ensures that disabled or elderly passengers, who may require more time in reaching the assigned elevator doors, are not prevented from using the destination entry system. If the passenger is detected to be moving away from the assigned elevator doors (indicating the passenger has decided not to take the elevator) then elevator control 18 may close the elevator doors and reassign the elevator to a new passenger.

The passenger is continuously monitored as described in step 46 until the passenger enters an elevator cab. At step 50, video server 12 determines whether the passenger entered the assigned elevator cab. In other embodiments, video server 12 communicates to elevator control 18 the elevator cab entered by a passenger, and elevator control 18 determines whether the passenger entered the assigned cab or not. If it is determined that the passenger entered an elevator cab that was not assigned to the passenger, then at step 52 elevator control 18 takes corrective action. In one embodiment, control system 14 may allow the passenger to use the unassigned car, and will redirect the elevator cab to the destination floor entered by the passenger at kiosk 20. In the alternative, elevator control 18 may have the ability to communicate to the passenger the mistake, and redirect the passenger to the correct elevator cab. If the elevator cab entered by the passenger is traveling to a restricted floor (i.e., that the passenger is not authorized to visit), then elevator control 18 may prevent elevator cab doors from closing or the elevator cab from being dispatched. Elevator control 18 may also notify security of the unauthorized passenger in the elevator cab.

If it is determined that the passenger has entered the correct elevator cab, then at step 54 elevator control 18 closes the elevator doors (assuming no other passengers are coming) and dispatches the elevator cab to the desired floor. By closing the doors as soon as the passenger is detected to have entered the assigned elevator cab, the door dwell time (i.e., time a passenger waits inside the elevator cab for the doors to close) is minimized.

Figure 3:
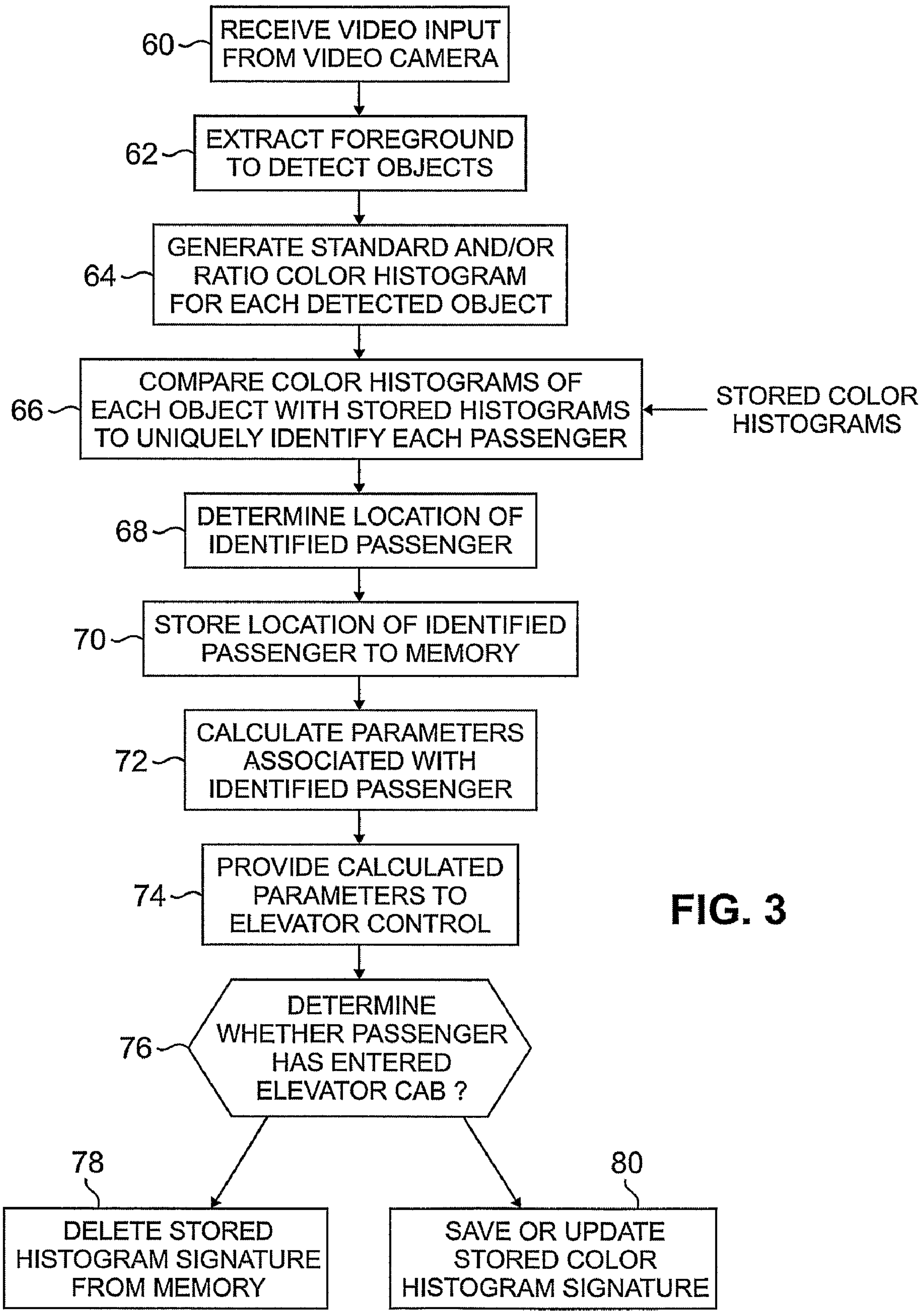
FIG. 3 is flow chart that illustrates algorithm employed in providing anonymous passenger tracking and indexing.
Figure 4A:
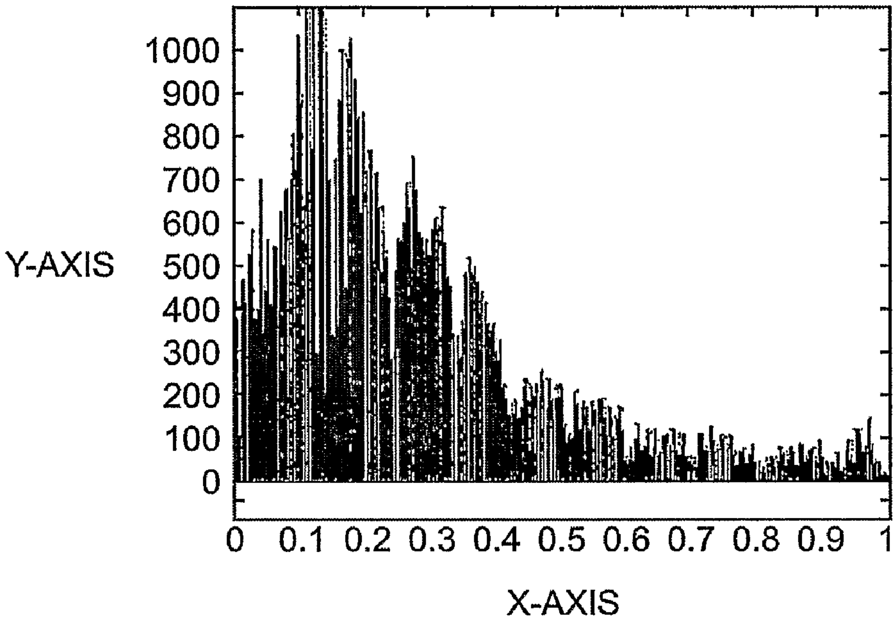
FIGS. 4A and 4B illustrate color histogram signatures generated for two elevator passengers.
Figure 4B:
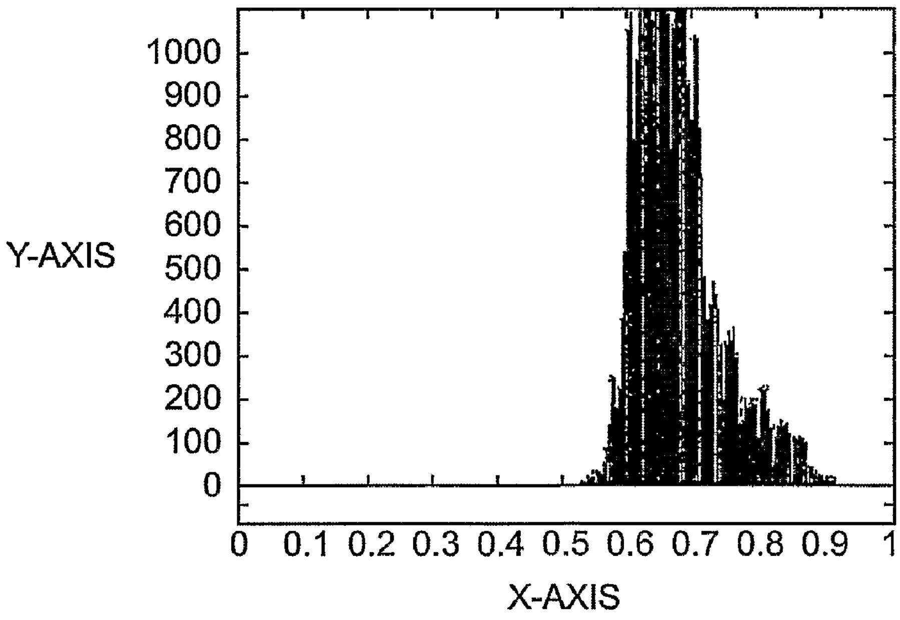

FIG. 3 is a flow-chart outlining the color-index algorithm used by video server 12 to anonymously identify passengers in elevator hall 26. In FIG. 3, color histogram signatures for each passenger have already been computed by video processor 14 (as shown in FIG. 1) and stored to memory 16 (as shown in FIG. 1). As discussed above, an initial color histogram signature is typically computed when a passenger requests elevator service from destination entry kiosk 16 (as shown in FIG. 1).

At step 60, video server 12 receives video input (current frame) from video camera 10 representing a current view of elevator hall 16 (as shown in FIG. 1). Video server 12 may include a frame buffer or other type of memory device for storing incoming frames until they can be processed by video processor 14. At step 62, video processor 14 extracts foreground objects from the current frame to detect passengers located in elevator hall 26. Detection of objects or passengers in elevator hall 26 is separate from identification of those detected passengers. Video detection identifies the objects that should be processed using color-indexing techniques. This process minimizes the amount of video data that must be processed by video processor 14, allowing video processor 14 to perform color histogram analysis only on foreground objects (i.e., passengers). Foreground extraction may be done by comparing the current frame with a background mask of an empty elevator hall. All passengers located in the current frame of the elevator hall are detected by identifying differences between the background mask and the current frame.

At step 64, following extraction of all foreground objects, video server 12 uses color indexing analysis to create a color histogram for each foreground object identified at step 62. Color histogram analysis includes identifying and categorizing each pixel included within the object identified as step 62. The result of the color histogram analysis is a color histogram representation of each object. For example, color histogram analysis of passengers A and B generates the color histograms shown in FIGS. 4A and 4B, respectively.

To generate a color histogram such as the ones shown in FIGS. 4A and 4B, video processor 14 categorizes each pixel making up a particular foreground object and places the pixel into a figurative "bin". A bin represents a range of particular values that allows similar objects or data (in this case, color of a pixel) to be grouped together. FIGS. 4A and 4B include an x-axis that includes a number of bins (approximately 250, although other embodiments could employ more or less) representing various colors, and an y-axis that represents the number of pixels associated with each of the bins. Based on the intensity (i.e., color) of the pixel, video processor 14 figuratively places the pixel into a bin corresponding with the identified pixel color. Each time a pixel is characterized as belonging to a particular bin, the count of pixels belonging to the particular bin is increased. The number of pixels belonging to a particular bin is shown graphically by the length of the bar representing each bin. This process results in a unique color histogram signature being created for each object located in the foreground of a current frame. This process would also be used initially to create an initial color histogram signature for each passenger.

The above description describes one method of generating a color histogram signature, in which pixels associated with each foreground object are classified based on the intensity of the particular pixel. In another embodiment, classification of each pixel is based in part on the intensity of surrounding pixels, providing what is known as ratio-based color indexing. In this embodiment, the intensity of each pixel is compared to the intensity of the adjacent pixels to generate a normalized color histogram. The normalized color histogram minimizes the effect of spatial illumination variation (i.e., lighting changes) as a passenger walks through different parts of elevator hall 26 (as shown in FIG. 1). For instance, if a passenger walks from a portion of elevator hall 26 that contains less lighting to a portion of elevator hall 26 that contains more lighting (such as through a sun-filled portion of elevator hall 26), then the intensity associated with each pixel will change. Using the standard color histogram analysis, the color histograms generated in the different lighting scenarios results will vary. If the difference between the two is significant, then it may be difficult to match the color histogram signature (created with respect to a first illumination level) with the current color histogram (created at a second illumination level). The use of normalized color histogram analysis minimizes the effects of changes in illumination. For instance, as a passenger moves through the sunlight portion of elevator hall 26 the intensity of adjacent pixels increase by a similar amount. Because the normalized color histogram defines intensity of each pixel with respect to adjacent pixels, the normalized color histogram will not change as a passenger moves through different lighting settings. For further information regarding normalized color histogram analysis, see Funt, Brian V and Finlayson, Graham D. *Color Constant Color Indexing*, IEEE Transactions on Pattern Analysis and Machine Intelligence, Vol. 17, No. 5 (May 1995) pages 522-529.

In one embodiment, video server 12 computes both a standard color histogram and a normalized color histogram. Generating both the standard color histogram and the normalized color histogram with respect to each object improves the robustness of the system and improves the ability of the video server 12 to accurately identify passengers throughout elevator hall 26.

At step 66, following calculation of either the standard color histogram or normalized color histogram (or both) with respect to each foreground object, video server 12 compares the generated color histogram to color histogram signatures stored to memory 16. By matching the color histogram calculated with respect to an object in the current frame with a stored color histogram signature, video server 12 is able to identify the object as a particular passenger. A number of comparison methods exist for determining whether the color histogram associated with an object matches a stored color histogram signature. In one embodiment, matches are determined by calculating a difference between the number of pixels in a first bin of the current color histogram with the number of pixels in a first bin of the stored color histogram signature. By comparing the number of pixels in each bin of the color histogram associated with an object with the number of pixels in the corresponding bins of the color histogram signature, a similarity or intersection of the two color histograms is calculated. In one embodiment, the comparison process between a color histogram representing an object and color histogram signatures stored in memory is continued only until a match of a significant confidence level is found. In another embodiment, the color histogram representing an object is compared to every color histogram signature stored in memory, with the highest rated intersection between the histograms resulting in identification of a passenger. The methods of comparing color histograms associated with a particular object with stored color histogram signatures remains the same regardless of whether a standard or ratio-based color histogram calculation is employed.

In another embodiment, in addition to the comparison between the current frame color histogram associated with a passenger and the stored color histogram signature, video server 12 may make use of location data stored with respect to previously identified passengers to verify passenger identification. For example, if the location of an identified passenger changes dramatically from frame to frame, then video server may determine that the most recent identification was erroneous, and will continue the comparison process. In addition, video server 12 may use the present location of the passenger being analyzed and the previous locations of identified passengers to determine which color histogram signatures should be compared with the current frame color histogram in order to reduce the number of comparisons that must be made before a match is found. In this embodiment, the location of the passenger being analyzed must be determined before anonymous identification of the passenger.

At step 68, following successful identification of a passenger at step 66, video server 12 determines the location of the passenger within elevator hall 26. Video based location determination may be calculated in any one of a number of ways. For instance, by including markers on the floor of elevator hall 26, the location of each passenger may be determined with respect to their proximity to different floor markers. If more than one video camera is employed, then the location of a passenger may be determined by comparing the location of the passenger as detected by each camera to calculate an accurate passenger location within elevator hall 26.

At step 70, the location of an identified passenger is stored to memory 16 or provided directly to elevator control 18. At step 72, the location of the identified passenger is then compared with previously stored locations of the identified passenger in order to calculate further data related to the identified passenger, such as direction, speed, and estimated time of arrival at a particular elevator cab. The direction and speed of an identified passenger may be computed by calculating the change in location of the identified passenger over a set amount of time. Based on the current location, direction and speed calculated with respect to a particular passenger, the estimated time of arrival at a particular elevator cab may also be computed. The estimated time or arrival indicates both a temporal expectation of arrival at an elevator cab based on distance from the elevator cab and direction and speed of an identified passenger as well an expectation or probability regarding whether the identified passenger will reach the elevator cab. For instance, if the location, direction and speed of a passenger indicates that the passenger is heading directly towards an assigned elevator, then the estimated time or arrival will indicate the remaining amount of time it should take the passenger to reach the elevator doors (assuming the passenger maintains the current speed and direction). In this case, there is also a high likelihood or probability that the passenger will reach the assigned elevator doors, based on the determination that the passenger is moving towards the elevator doors. In contrast, if the identified passenger were detected to be moving away from the assigned elevator doors, or towards an unassigned elevator door, then the estimated time of arrival would increase to indicate the likelihood that the passenger will not arrive at the assigned elevator doors. Furthermore, by monitoring the location of an identified passenger, video server 12 is also able to detect the elevator cab entered by an identified passenger.

At step 74, passenger data including at least one of location, direction, speed, estimated time of arrival, and elevator cab entered are communicated by video server 12 to elevator control 18. Based on these parameters, elevator control 18 controls elevator dispatch and door control to improve overall performance.

At step 76, video server 12 determines whether a passenger has entered an elevator cab. If the passenger has entered an elevator cab, then at step 78 the color histogram signature stored with respect to that passenger is deleted from memory 16. This prevents having to compare current color histograms to the color histogram signatures of passengers no longer located in elevator hall 26. If the passenger has not entered an elevator cab, then at step 80 the color histogram signature stored with respect to that passenger is maintained in memory. In one embodiment, the stored color histogram signature of the identified passenger is updated based on the current color histogram calculated with respect to the passenger. In this way, changes made by a passenger such as removal of a coat may be detected, and corresponding changes can be made to the color histogram signature stored in memory 16, to ensure accurate identification of the passenger in subsequent frames. The process is repeated by returning to step 60 to analyze the next frame of video input from video camera 10.

Although the present invention has been described with reference to preferred embodiments, workers skilled in the art will recognize that changes may be made in form and detail without departing from the spirit and scope of the invention. In particular, the above system has been described with respect to a destination entry system, but is applicable to any system that could benefit from anonymous tracking of passengers. For instance, an elevator hall that requires identification (i.e., RFID card, biometric scan) in order to access elevator cabs could make use of the present invention to ensure that the person that provides the access information is the person that enters the secure elevator cab. This would prevent situations (known as piggy-backing or card pass-back) in which an authorized passenger provides authentication that an unauthorized passenger (with or without the knowledge of the authorized passenger) uses to access the secure elevator cab.

The invention claimed is:

1. A video-aided method of elevator control, the method comprising:
   capturing a video frame associated with an elevator hall;
   analyzing the video frame using color-index analysis to anonymously identify passengers in the elevator hall;
   calculating passenger data based on the anonymous identification of each passenger; and
   controlling elevator operation based in part on the calculated passenger data.

2. The video-aided method of claim 1, wherein analyzing the video frame includes:
   detecting passengers in the video frame by identifying foreground objects;
   creating a color histogram for each detected passenger in the video frame;
   comparing the color histogram created for each detected passenger to stored color histogram signatures; and
   anonymously identifying each detected passenger based on the results of the comparison between the color histograms created for each detected passenger and the stored color histogram signatures.

3. The video-aided method of claim 2, wherein creating a color histogram includes:
   classifying each pixel in a detected passenger based on color of the pixel, wherein pixels of similar color are grouped together in corresponding bins making up the color histogram.

4. The video-aided method of claim 2, wherein creating a color histogram includes:
   classifying each pixel in a detected passenger based on color of the pixel and color of adjacent pixels and grouping similarly identified pixels together in corresponding bins making up the color histogram.

5. The method of claim 2, wherein analyzing the video frame further includes:
   identifying each passenger based in part on location data stored with respect to an identified passenger in a previous frame.

6. The method of claim 1, wherein calculating passenger data includes:
   calculating at least one passenger parameter selected from the group comprising: location, speed, direction, estimated time of arrival, and elevator entered.

7. The method of claim 1, wherein controlling elevator operation includes:
   controlling at least one of the following selected from the group including: elevator door opening and closing, elevator dispatch, and elevator security.

8. A video aided elevator control system comprising:
   a video camera for capturing video images of an elevator hall and elevator doors within a field of view of the video camera;
   a video processing device connected to receive the video images from the video camera and having video analysis software that includes color index analysis, wherein the video processing device identifies passengers based on the color index analysis and calculates passenger data associated with each identified passenger; and
   an elevator controller connected to receive the calculated passenger data from the video processing device, wherein the elevator controller controls at least one of elevator dispatch and elevator door control functions based on the passenger data provided by the video processing device.

9. The video aided elevator control system of claim 8, wherein the video-processing device includes:
   memory storage device; and
   a video processor for performing color indexing analysis that includes calculating a color histogram signature of each passenger, wherein the color histogram signature is stored in the memory storage device.

10. The video aided elevator control system of claim 9, wherein the color indexing analysis performed by the video processor includes calculating a current color histogram for each object detected in a current video frame and comparing the color histogram signatures stored in memory with the current color histogram to identify passengers in the current video frame.

11. The video-aided elevator control system of claim 10, wherein passenger data calculated by the video processor is based in part on identification of the passenger in the current video frame.

12. The video-aided elevator control system of claim 11, wherein passenger data calculated by the video processor is based in further part on identification of the passenger in successive video frames.

13. The video-aided elevator control system of claim 12, wherein the passenger data calculated by the video processor includes at least one of the following, including location, speed, direction and estimated time of arrival of the identified passenger.

14. The video-aided elevator control system of claim 8, further including:
   a destination entry kiosk for receiving floor destination data from a passenger and for communicating the floor destination entered by the passenger to the elevator controller, wherein the elevator controller assigns an elevator cab to the passenger.

15. The video aided elevator control system of claim 14, wherein the video-processing device includes:
   memory storage device; and
   a video processor for performing color indexing analysis performed by the video processor that includes calculating a color histogram signature of each passenger upon notice from the elevator controller that the passenger has entered floor destination data at the destination entry kiosk, wherein the color histogram signature is stored in the memory storage device.

16. A video-aided method for providing anonymous tracking of passengers in a destination entry system, the method comprising:
   receiving a request from a passenger for elevator service to a destination floor;
   assigning the passenger to a particular elevator cab based on the requested elevator destination floor;
   generating a color histogram signature of the passenger that identifies the passenger;
   monitoring the movement of the passenger within an elevator hall based on the generated color histogram signature associated with the passenger;
   calculating passenger parameters associated with the passenger based on the identification of the passenger; and
   controlling elevator operations based in part on the calculated passenger parameters.

17. The method of claim 16, wherein generating a color histogram signature includes:

classifying pixels representing a passenger based on color into one or more bins, wherein each bin stores a count of pixels corresponding to a particular range of color.

18. The method of claim 16, wherein generating a color histogram signature includes:

classifying pixels representing a passenger based on color of the pixel and color of adjacent pixels into one or more bins, wherein each bin stores a count of pixels corresponding to a particular range of color.

19. The method of claim 16, wherein monitoring the movement of the passenger within an elevator hall includes:

detecting passengers in a current video frame by identifying foreground objects;

generating a color histogram for each detected passenger;

comparing the color histogram created for each detected passenger to stored color histogram signatures; and identifying each detected passenger based on the results of the comparison between the color histogram generated with respect to each detected passenger in the current frame to the stored color histogram signatures.

20. The method of claim 16, wherein calculating passenger parameters includes:

calculating at least one passenger parameter selected form the group comprising: location, speed, direction, estimated time of arrival, and elevator entered.

* * * * *